J. DAVIES & C. C. SKINNER.
Ditching-Plows.

No. 156,139.  Patented Oct. 20, 1874.

Witnesses:—
E. Middleditch Brookes.
Chas. J. Gooch

Inventors:—
James Davies
Charles C. Skinner
by Colborne Brookes
their Attorney

UNITED STATES PATENT OFFICE.

JAMES DAVIES, OF MAZO MANIE, AND CHARLES C. SKINNER, OF EAU CLAIRE, WISCONSIN.

IMPROVEMENT IN DITCHING-PLOWS.

Specification forming part of Letters Patent No. 156,139, dated October 20, 1874; application filed August 11, 1874.

*To all whom it may concern:*

Be it known that we, JAMES DAVIES, of Mazo Manie, in the county of Dane and State of Wisconsin, and CHARLES C. SKINNER, of Eau Claire, in the county of Eau Claire and State of Wisconsin, have invented certain new and useful Improvements in Ditching-Plows; and we do hereby declare that the following is a full, clear, and exact description thereof, which will enable others skilled in the art to which it pertains to make and use the same, reference being had to the accompanying drawings and to the letters of reference marked thereon, which form a part of this specification.

Our invention relates to improvements in ditching-plows, the nature of which will be hereinafter fully explained.

Figure 1:
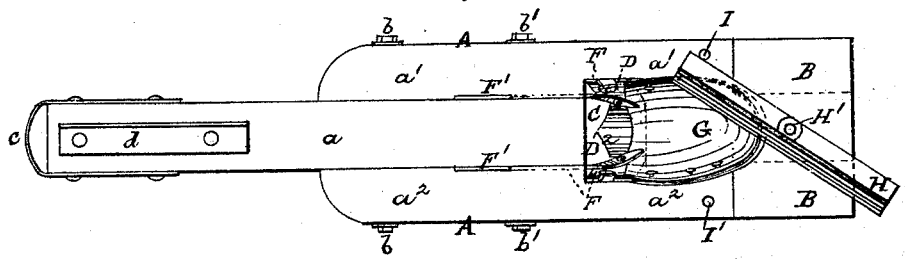
Figure 2:
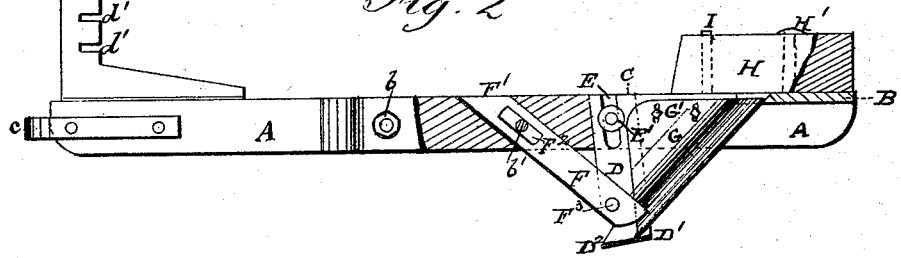
Figure 3:
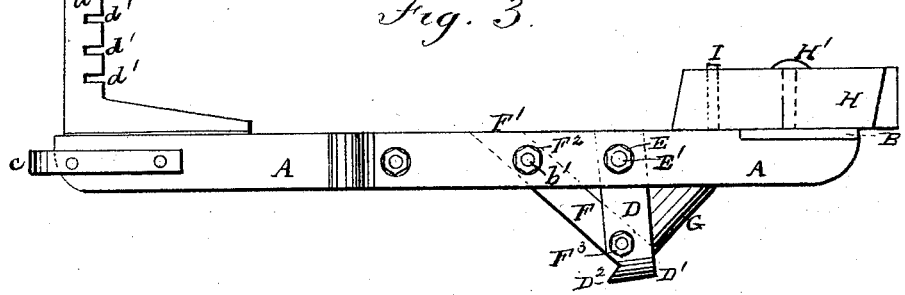

In the accompanying drawings, Figure 1 represents a plan, Fig. 2 a section, and Fig. 3 a side view, of a plow constructed according to our invention.

A represents the main framing of the plow, which is formed by preference in three parts, $a$ $a^1$ $a^2$. The parts $a^1$ $a^2$, at their front ends, are connected to the center part $a$ by bolts $b$ $b'$, which pass through and securely hold all three parts together. The part $a$ is, however, extended forward, and provided with a draft-loop, $c$, at its front end, and on its upper side it is furnished with an upright projection or bracket, $d$, which is formed with a series of notches or recesses, $d'$, for the reception of draft ropes or chains. At their rear ends the parts $a^1$ $a^2$ are connected together by means of platform B, which extend from side to side of the apparatus. C represents a gangway, formed centrally in the frame A, in and beneath which are arranged the cutters and mechanism for cutting the ditch. D represents a cutter, the lower end $D^1$ of which is formed circular, or nearly so, and on its front edge is provided with a pointed cutter, $D^2$, for forming the bottom of the ditch. This cutter D is provided with slots or grooves E, through which bolts E' pass for the purpose of connecting the cutter to the frame A at each side of the gangway C. The slots E are formed for the purpose of allowing of the raising and lowering of the cutter for adjustment of the depth of cut, as may be desired. F F are other cutters, arranged on each side of the cutter D, for the purpose of forming the sides of the ditch. These cutters, at their upper ends, are received and held with capability of adjustment in grooves $F^1$, formed in the frame A, and they are retained in position by means of the bolt $b'$ passing through slots $F^2$ in their upper ends. At their lower ends the cutters F are by pin-joints or bolts $F^3$ connected to the sides of the cutter D. G is an adjustable scoop or guide for conducting the earth cut by the cutters D F to the upper side of the frame A, where it is conducted to either side of the apparatus by means of a guide-board, H. The scoop or guide G is connected to the frame by bolts and nuts G', or by other suitable adjustable means. The guide-board H is pivoted to the platform B by means of a pin, H', and it is prevented from being turned out of position by a stop-pin, I, which is adjustable and capable of being placed on either side of the apparatus.

As shown in the drawings, the stop-pin I is represented in position as holding the guide-board H so as to conduct the earth raised by the apparatus to the left-hand side of frame A, by turning the guide-board H to the opposite side, and placing the pin I in the hole I', the earth may be conducted to the left-hand side of the frame.

The operation of the apparatus is as follows: A hole is first dug with a spade for the reception of the cutters D F and parts below the under surface of the frame A in the line of the desired ditch. Ropes, chains, or other tackle from a windlass or other motive-power are then connected to the apparatus, and the same is drawn through the ground with the platform A resting on the surface of the ground. The cutters D F will then form the bottom and sides of the ditch, and the earth removed by them will be forced up the scoop or guide G to the platform B, from which it is conducted to either side of the frame by the guide-board H.

Having thus described our invention, what we claim and desire to secure by Letters Patent, is—

In a ditching-machine, the combination of the frame A, cutters F D, and scoop G, with a guide-board, H, pivoted to throw the earth in either direction, substantially as described.

In testimony that we claim the foregoing as our own joint invention we affix our signatures in presence of two witnesses.

JAMES DAVIES.
CHARLES C. SKINNER.

Witnesses:
TEXAS ANGEL,
L. M. VILAS.